United States Patent
Lee

(10) Patent No.: US 11,834,975 B2
(45) Date of Patent: Dec. 5, 2023

(54) METHOD FOR PURIFYING EXHAUST GAS AND ELECTRONIC DEVICE THEREFOR

(71) Applicant: Vitesco Technologies GmbH, Regensburg (DE)

(72) Inventor: ChangHoon Lee, Seongnam (KR)

(73) Assignee: Vitesco Technologies GmbH, Regensburg (DE)

(*) Notice: Subject to any disclaimer, the term of this patent is extended or adjusted under 35 U.S.C. 154(b) by 0 days.

(21) Appl. No.: 17/664,106

(22) Filed: May 19, 2022

(65) Prior Publication Data

US 2022/0275742 A1 Sep. 1, 2022

Related U.S. Application Data

(63) Continuation of application No. PCT/EP2020/082663, filed on Nov. 19, 2020.

(30) Foreign Application Priority Data

Nov. 20, 2019 (KR) .................. 10-2019-0149707

(51) Int. Cl.
*F01N 3/20* (2006.01)
*F01N 3/10* (2006.01)

(52) U.S. Cl.
CPC .......... *F01N 3/2013* (2013.01); *F01N 3/101* (2013.01); *F01N 2240/16* (2013.01); *F01N 2900/1402* (2013.01); *F01N 2900/1621* (2013.01)

(58) Field of Classification Search
CPC .......... F01N 2240/16; F01N 2560/025; F01N 2900/06; F01N 2560/14; F01N 2900/1402;
(Continued)

(56) References Cited

U.S. PATENT DOCUMENTS 5,267,472 A 12/1993 Schneider et al.
5,408,073 A 4/1995 Jeong
(Continued)

FOREIGN PATENT DOCUMENTS

DE 4112478 A1 10/1992
DE 102010030635 A1 12/2011
(Continued)

OTHER PUBLICATIONS

International Search Report and Written Opinion dated Feb. 1, 2021 from corresponding International Patent Application No. PCT/EP2020/082663.
(Continued)

*Primary Examiner* — Anthony Ayala Delgado

(57) ABSTRACT

The disclosure relates to a method for purifying exhaust gas and to an electronic device therefor. The electronic device includes: a sensor module; a heating device; a memory; and a processor operatively coupled to the sensor module, the heating device, and the memory. The processor is configured to: control the heating device such that a catalytic converter of a vehicle is heated, measure an air-fuel ratio of exhaust gas passing through the catalytic converter using the sensor module during heating of the catalytic converter, and control the heating device such that heating of the catalytic converter is ended based on the air-fuel ratio of the exhaust gas.

6 Claims, 3 Drawing Sheets

(58) Field of Classification Search
CPC ........... F01N 3/2013; F01N 2900/1621; F01N 2550/02
See application file for complete search history.

(56) References Cited

U.S. PATENT DOCUMENTS

| | | | | |
|---|---|---|---|---|
| 5,689,952 | A * | 11/1997 | Kato | H02J 7/1438 |
| | | | | 60/284 |
| 5,758,492 | A * | 6/1998 | Kato | F01N 11/00 |
| | | | | 60/277 |
| 5,806,307 | A * | 9/1998 | Aoki | F01N 3/2013 |
| | | | | 60/284 |
| 6,212,880 | B1 | 4/2001 | Takano et al. | |
| 8,863,497 | B1 | 10/2014 | Legare | |
| 9,410,458 | B2 * | 8/2016 | Gonze | F01N 3/2026 |
| 2001/0011455 | A1 | 8/2001 | Harima | |
| 2015/0041320 | A1 | 12/2015 | Yamada | |
| 2022/0106896 | A1 * | 4/2022 | Lloyd | F01N 9/00 |

FOREIGN PATENT DOCUMENTS

| | | |
|---|---|---|
| DE | 102014215766 A1 | 2/2015 |
| JP | H05231138 A | 9/1993 |
| JP | H09144580 A | 6/1997 |
| JP | 3065182 U | 1/2000 |
| JP | 3747693 B2 | 2/2006 |
| JP | 5781290 B2 | 9/2015 |
| KR | 20010011562 A | 2/2001 |
| KR | 20010078239 A | 8/2001 |
| KR | 101816359 B1 | 6/2017 |

OTHER PUBLICATIONS

Korean Notice of Allowance dated Jan. 27, 2022 for corresponding Korean Patent Application No. 10-2019-0149707.
Korean Office Action dated 21 dated Nov. 21, 2021 for corresponding Korean Patent Application No. 10-2019-0149707.

* cited by examiner

METHOD FOR PURIFYING EXHAUST GAS AND ELECTRONIC DEVICE THEREFOR

CROSS-REFERENCE TO RELATED APPLICATIONS

This application claims the benefit of PCT Application PCT/EP2020/082663, filed Nov. 19, 2020, which claims priority to Korean Application 10-2019-0149707, filed Nov. 20, 2019. The disclosures of the above applications are incorporated herein by reference.

TECHNICAL FIELD

The disclosure relates to a method for purifying exhaust gas and to an electronic device therefor.

BACKGROUND

In recent times, the problem of atmospheric pollution due to exhaust gases is becoming a serious social issue as the usage of vehicles increases and the volume of traffic increases. Consequently, exhaust gas regulations relating to the emission of pollutants, such as carbon monoxide (CO), hydrocarbons (HC), and nitrogen oxides (NOx), within exhaust gases are gradually being tightened.

Generally, in order for vehicles to satisfy exhaust gas emission standards, three way catalytic converters are installed in exhaust systems to promote the decomposition of hydrocarbons, the oxidation of carbon monoxide, and the reduction of nitrogen oxides.

Three way catalytic converters are activated by heating until the temperature of the three way catalytic converter reaches a temperature equal to or higher than a temperature that conforms with an activation temperature model, and, when activated, can remove polluting components in exhaust gases. Since the activation temperature model is generated on the basis of the test results of standard development test vehicles, there may be a difference between the actual temperature for activating the three way catalytic converter and the activation temperature model due to variations between vehicles and system malfunctions such as failures. Consequently, the exhaust gas polluting component control performance can deteriorate either because the heating operation ends before the three way catalytic converter reaches the activation temperature or because the heating operation is continuously maintained when the three way catalytic converter has reached the activation temperature. Accordingly, a solution that ensures the purification efficiency of three way catalytic converters, regardless of vehicle state, may be required.

SUMMARY

The disclose relates to a method and device for ensuring the purification efficiency of three way catalytic converters, regardless of vehicle state. One aspect of the disclosure provides an electronic device for purifying exhaust gas. The electronic device includes: a sensor module; a heating device; a memory; and a processor operatively coupled to the sensor module, the heating device, and the memory. The processor is operable to: control the heating device such that a catalytic converter of a vehicle is heated, measure an air-fuel ratio of exhaust gas passing through the catalytic converter using the sensor module during heating of the catalytic converter, and control the heating device such that heating of the catalytic converter is ended based on the air-fuel ratio of the exhaust gas.

Implementations of the disclosure may include one or more of the following optional features. In some implementations, the electronic device further includes a communication unit. The processor is operable to receive an input for activating the catalytic converter via the communication circuit, and control the heating device such that the catalytic converter is heated in response to the receipt of the input.

In some implementations, the sensor module includes a first sensor module and a second sensor module. The processor may also be operable to: measure a first air-fuel ratio of exhaust gas entering the catalytic converter using the first sensor module; and measure a second air-fuel ratio of exhaust gas exiting the catalytic converter using the second sensor module.

In some implementations, the processor is operable to: identify a purification efficiency of the catalytic converter by comparing the first air-fuel ratio and the second air-fuel ratio; and determine whether the purification efficiency exceeds a reference efficiency. When the purification efficiency exceeds the reference efficiency, the processor is operable to control the heating device such that heating of the catalytic converter is ended.

In some implementations, when the purification efficiency does not exceed the reference efficiency, the processor is operable to control the heating device such that heating of the catalytic converter is maintained.

Another aspect of the disclosure provides a method for purifying exhaust gas including steps in which: a processor controls a heating device such that a catalytic converter of a vehicle is heated; the processor measures an air-fuel ratio of exhaust gas passing through the catalytic converter using a sensor module during heating of the catalytic converter; and the processor controls the heating device such that heating of the catalytic converter is ended based on the air-fuel ratio of the exhaust gas.

In some implementations, the step of controlling the heating device such that the catalytic converter is heated includes steps in which: the processor receives an input for activating the catalytic converter via a communication circuit, and the processor controls the heating device such that the catalytic converter is heated in response to the receipt of the input.

In some implementations, the sensor module includes a first sensor module and a second sensor module. The step of measuring the air-fuel ratio of the exhaust gas may include steps in which: the processor measures a first air-fuel ratio of the exhaust gas entering the catalytic converter using the first sensor module; and the processor measures a second air-fuel ratio of the exhaust gas exiting the catalytic converter using the second sensor module.

In some implementations, the step of controlling the heating device such that heating of the catalytic converter is ended includes steps in which: the processor identifies a purification efficiency of the catalytic converter by comparing the first air-fuel ratio and the second air-fuel ratio; the processor determines whether the purification efficiency exceeds a reference efficiency; and when the purification efficiency exceeds the reference efficiency, the processor controls the heating device such that heating of the catalytic converter is ended.

In some examples, the method further includes a step in which: when the purification efficiency does not exceed the reference efficiency, the processor controls the heating device such that heating of the catalytic converter is maintained.

The various implementations of the present disclosure can ensure the purification efficiency of three way catalytic converters, regardless of vehicle state, by measuring the purification efficiency of the vehicle catalytic converter and controlling the heating of the vehicle catalytic converter on the basis of the measured purification efficiency.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
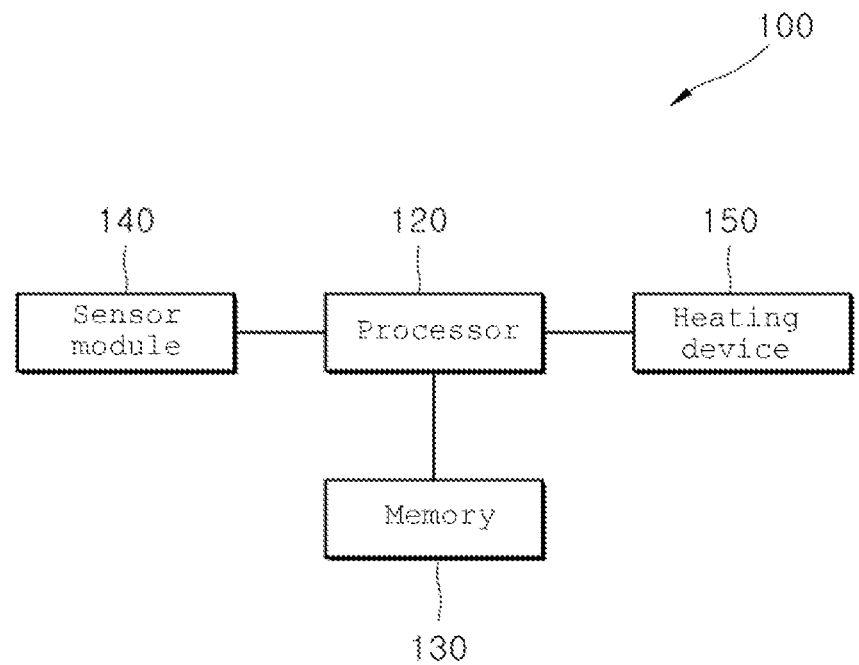
FIG. 1 is a block diagram of an exemplary electronic device.

Hereinbelow, various implementations of the present disclosure are described with reference to the accompanying drawings. The implementations and examples and the terms used therewith are not intended to limit the technology described in the present document to the specific forms in the implementations, and should be understood to include various modifications, equivalents, and/or substitutions to the examples in question. In relation to description of the drawings, similar reference numerals may be used for similar constituent elements. Expressions in the singular can include expressions in the plural unless made clear otherwise from the context. In the present document, expressions such as "A or B" or "at least one of A and/or B" may include all possible combinations of the items listed together. Phrases such as "$1^{st}$", "$2^{nd}$" "first", or "second" may modify the corresponding constituent element regardless of the order or importance thereof, and are merely used to differentiate one constituent element from another constituent element without limiting the constituent elements. Where it is stated that a particular (e.g. first) constituent element is "(functionally or communicatively) coupled" or "connected" to another (e.g. second) constituent element, that particular constituent element may be directly connected to the other constituent element or may be connected by means of another constituent element (e.g. a third constituent element).

In the present document, "configured (or set up) to" can be used interchangeably with, for example, "suitable for", "has the ability to", "changed so as to", "made such that", "capable of" and "designed such that" in terms of hardware or software, depending on the circumstances. In certain circumstances, the expression "a device configured to" may mean that the device is "capable of doing" together with another device or components. For example, the wording "processor configured (or set up) to perform A, B and C" can mean a dedicated processor (e.g. embedded processor) for performing the operations in question, or a general processor (e.g. CPU or application processor) capable of performing the operations in question by executing at least one software program stored in a memory device.

FIG. 1 is a block diagram of an exemplary electronic device.

Referring to FIG. 1, the electronic device 100 may include: a processor 120; a memory 130; a sensor module 140; and a heating device 150. But the electronic device is not limited thereto. For example, the electronic device 100 may further include: an input device for information input; an output device for information output; and/or a communication circuit for communication.

In some implementations, the processor 120 drives a management system or an application so as to be able to control a plurality of hardware or software constituent elements connected to the processor 120 and be able to perform various forms of data processing and calculations. In some examples, the processor 120 is implemented as a system on a chip (SoC). The processor 120 loads, into the memory 130, instructions or data received from at least one of the other constituent elements and processes same, and various forms of data can be stored in the memory 130.

In some implementations, the processor 120 responds to receiving input for activating the vehicle catalytic converter (or three way catalytic converter) so as to heat the catalytic converter by the heating device 150. For example, when the processor 120 receives, via a communication circuit (not shown), information indicating that the engine is operating, the processor 120 can control the heating device 150 so as to heat the vehicle catalytic converter.

In some implementations, the processor 120 identifies the purification efficiency of the vehicle catalytic converter while the vehicle catalytic converter is heated by the heating device 150. For example, the processor 120 identifies a first air-fuel ratio of the exhaust gas entering the catalytic converter and a second air-fuel ratio of the exhaust gas exiting the catalytic converter, by the sensor module 140 attached to the vehicle catalytic converter, and can calculate the purification efficiency of the catalytic converter on the basis of the first air-fuel ratio and second air-fuel ratio. In some examples, the processor 120 can identify the purification efficiency of the vehicle catalytic converter periodically, aperiodically, or in real time while heating the vehicle catalytic converter by the heating device 150.

In some implementations, the processor 120 can control the heating device 150 so as to end heating of the vehicle catalytic converter on the basis of the purification efficiency of the vehicle catalytic converter. For example, the processor 120 determines whether the purification efficiency of the vehicle catalytic converter exceeds a reference efficiency pre-stored in the memory 130, and, when the purification efficiency of the vehicle catalytic converter does not exceed the reference efficiency, can control the heating device 150 such that the vehicle catalytic converter is continuously heated, and, when the purification efficiency of the vehicle catalytic converter does exceed the reference efficiency, can control the heating device 150 such that heating of the vehicle catalytic converter is ended.

In some implementations, the sensor module 140 is attached to the vehicle catalytic converter or to the exhaust piping connected to the vehicle catalytic converter, and can measure the first air-fuel ratio of the exhaust gas entering the vehicle catalytic converter and the second air-fuel ratio of the exhaust gas exiting the vehicle catalytic converter. The sensor module 140 can provide, to the processor 120, information about the measured first air-fuel ratio and second air-fuel ratio. In some examples, the sensor module 140 can include a plurality of air-fuel-ratio sensors for measuring the air-fuel ratio from the exhaust gas. For example, the sensor module 140 can include: a first air-fuel ratio sensor for measuring the first air-fuel ratio of the exhaust gas entering the vehicle catalytic converter; and a second air-fuel ratio sensor for measuring the second air-fuel ratio of the exhaust gas exiting the vehicle catalytic converter.

In some implementations, the heating device 150 can generate heat energy on the basis of power provided from the vehicle battery, and heat the vehicle catalytic converter by using the generated heat energy.

Figure 2:
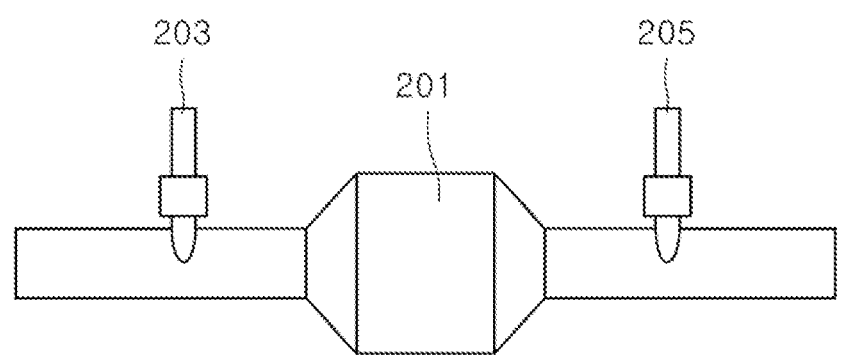
FIG. 2 is an illustration for describing the operation of an exemplary sensor module attached to the catalytic converter.
Figure 3A:
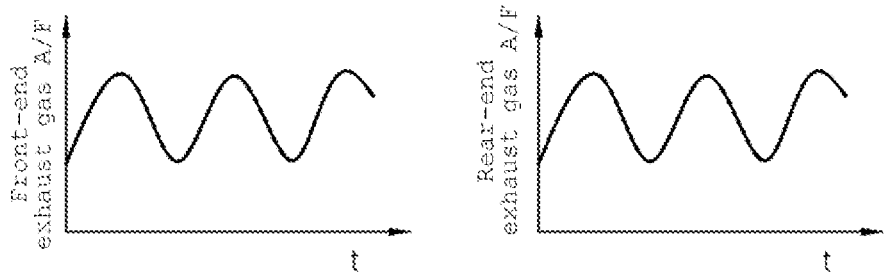
FIG. 3a and FIG. 3b are drawings showing examples of air-fuel ratios measured by the sensor module in the electronic device.
Figure 3B:
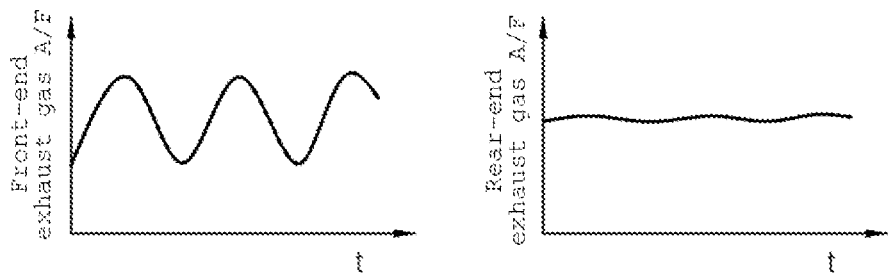

FIG. 2 is an illustration for describing the operation of a sensor module attached to the catalytic converter. FIG. 3a and FIG. 3b are drawings showing examples of air-fuel ratios measured by the sensor module in the electronic device.

Referring to FIG. 2 through FIG. 3b, the sensor module (e.g. the sensor module 140 in FIG. 1) can include: a first sensor module 203 attached to exhaust piping through which the exhaust gas enters the vehicle catalytic converter 201; and a second sensor module 205 attached to exhaust piping through which the exhaust gas exits the vehicle catalytic converter 201.

In some implementations, the first sensor module 203 and the second sensor module 205 can measure the air-fuel ratio of the exhaust gas passing through the exhaust piping. For example, the first sensor module 203 can measure the first air-fuel ratio of the front-end exhaust gas entering the vehicle catalytic converter 201 via the exhaust piping, and the second sensor module 205 can measure the second air-fuel ratio of the exhaust gas exiting the vehicle catalytic converter 201 via the exhaust piping.

In some implementations, when the vehicle catalytic converter 201 is not heated, as shown in FIG. 3a the first air-fuel ratio measured by the first sensor module 203 (e.g. the front-end exhaust gas A/F) and the second air-fuel ratio measured by the second sensor module 205 (e.g. the rear-end exhaust gas A/F) may have the same value.

In some implementations, when the vehicle catalytic converter 201 is heated, as shown in FIG. 3b the first air-fuel ratio measured by the first sensor module 203 (e.g. the front-end exhaust gas A/F) and the second air-fuel ratio measured by the second sensor module 205 (e.g. the rear-end exhaust gas A/F) may have different values. For example, when the vehicle catalytic converter 201 is heated, the peak-to-peak value of the second air-fuel ratio (e.g. the rear-end exhaust gas A/F) measured by the second sensor module 205 may become gradually smaller as the purification efficiency of the vehicle catalytic converter 201 increases.

In some implementations, the first sensor module 203 and the second sensor module 205 can provide, to the processor (e.g. the processor 120 in FIG. 1), information about the measured first air-fuel ratio and second air-fuel ratio. For example, the first sensor module 203 and the second sensor module 205 can provide, to the processor 120, the information about the measured first air-fuel ratio and second air-fuel ratio, periodically, aperiodically, or in real time. The processor 120 can respond to receiving the information about the first air-fuel ratio and the second air-fuel ratio from the first sensor module 203 and the second sensor module 205, and identify the purification efficiency of the vehicle catalytic converter 201 by comparing the peak-to-peak value of the first air-fuel ratio and the peak-to-peak value of the second air-fuel ratio and identifying the purification efficiency value which corresponds to the difference between the two values based on table information pre-stored in the memory 130. In some examples, the purification efficiency can have a higher value the larger the difference between the peak-to-peak value of the first air-fuel ratio and the peak-to-peak value of the second air-fuel ratio.

Figure 4:
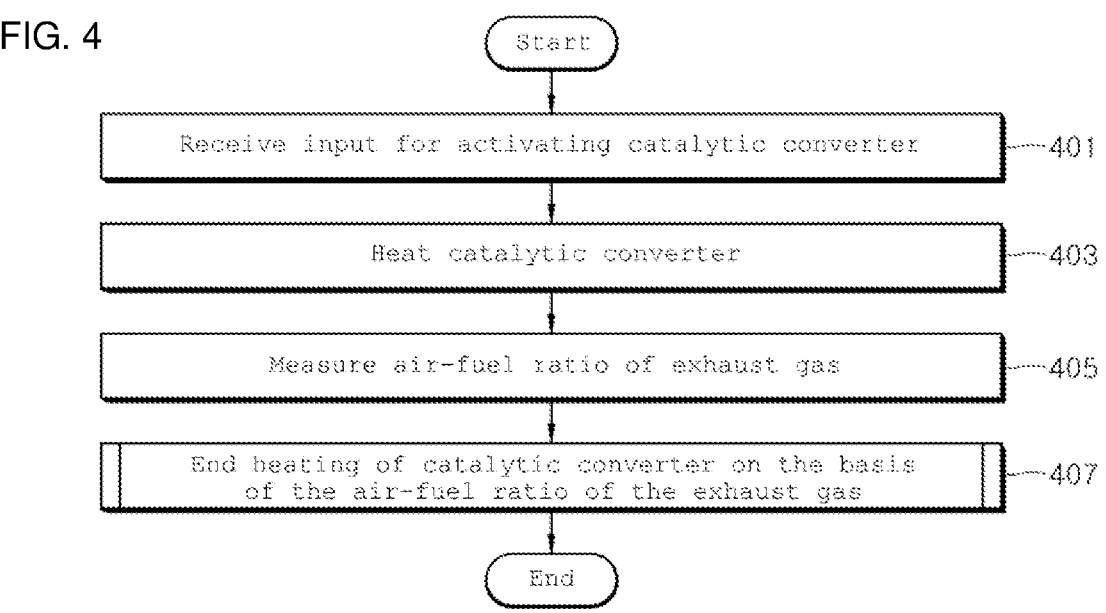
FIG. 4 is an exemplary flow diagram for explaining the method for controlling the heating of the catalytic converter in the electronic device.

FIG. 4 is a flow diagram for explaining a method for controlling heating of the catalytic converter in the electronic device.

Referring to FIG. 4, in operation 401, the processor (e.g. the processor 120 in FIG. 1) of the electronic device (e.g. the electronic device 100 in FIG. 1) can receive input for activating the vehicle catalytic converter (e.g. the catalytic converter 201 in FIG. 2). For example, when the processor 120 receives, via a communication circuit of the electronic device 100, information indicating that the vehicle engine is operating, the processor can determine that input for activating the vehicle catalytic converter has been received.

In operation 403, the processor 120 can respond to receiving the input for activating the vehicle catalytic converter and so control the heating device 150 so as to heat the vehicle catalytic converter.

In operation 405, the processor 120 can measure the air-fuel ratio of the exhaust gas passing through the vehicle catalytic converter via the sensor module 140 during heating of the catalytic converter. For example, the processor 120 can measure, using the sensor module 140, the first air-fuel ratio of the exhaust gas entering the vehicle catalytic converter and the second air-fuel ratio of the exhaust gas exiting the vehicle catalytic converter. In some examples, the processor 120 can measure the first air-fuel ratio and the second air-fuel ratio periodically, aperiodically, or in real time, in response to the start of the heating operation of the vehicle catalytic converter.

In operation 407, the processor 120 can control the heating device 150 such that heating of the vehicle catalytic converter is ended on the basis of the air-fuel ratio(s) of the exhaust gas. For example, the processor 120 can identify the purification efficiency of the vehicle catalytic converter by comparing the first air-fuel ratio and the second air-fuel ratio, and can determine whether the identified purification efficiency exceeds a reference efficiency pre-stored in the memory 130, and, when the identified purification efficiency does exceed the reference efficiency, can control the heating device 150 such that heating of the vehicle catalytic converter is ended. In some examples, when the identified purification efficiency does not exceed the reference efficiency, the processor 120 can again perform operation 403 of heating the vehicle catalytic converter.

In some implementations, after the processor 120 has performed operation 407 in which the heating of the vehicle catalytic converter is ended, the processor then continuously measures the purification efficiency of the vehicle catalytic converter by way of the sensor module 140, and can again perform operation 403 of heating the vehicle catalytic converter in response to identifying that the measured purification efficiency is below the reference efficiency.

As has been described above, the electronic device 100 can ensure the purification efficiency of three way catalytic converters, regardless of vehicle state, by measuring the purification efficiency of the vehicle catalytic converter and controlling the heating of the vehicle catalytic converter on the basis of the measured purification efficiency.

Figure 5:
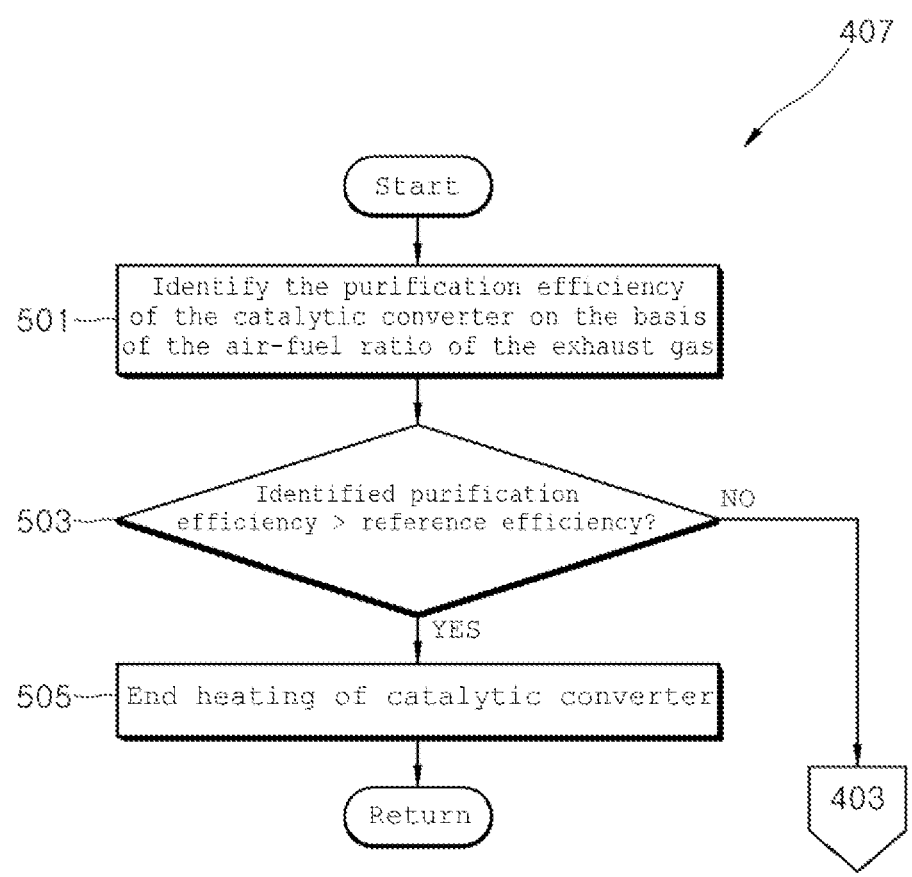
FIG. 5 is an exemplary flow diagram for explaining the method for ending the heating of the catalytic converter in the electronic device.

FIG. 5 is a flow diagram for explaining the method for ending the heating of the catalytic converter in the electronic device. The explanation below can involve a detailed operation of the operation of ending the heating of the catalytic converter in operation 407 of FIG. 4.

Referring to FIG. 5, in operation 501, the processor (e.g. the processor 120 in FIG. 1) of the electronic device (e.g. the electronic device 100 in FIG. 1) can identify the purification efficiency of the catalytic converter (e.g. catalytic converter 201 of FIG. 2) on the basis of the air-fuel ratio of the exhaust gas. For example, the processor 120 identifies the first air-fuel ratio of the exhaust gas entering the catalytic converter and the second air-fuel ratio of the exhaust gas exiting the catalytic converter by means of the sensor module 140 attached to the vehicle catalytic converter, and can calculate the purification efficiency of the catalytic converter by comparing the first air-fuel ratio and the second air-fuel ratio.

In operation 503, the processor 120 can determine whether the identified purification efficiency exceeds the reference efficiency. For example, the processor 120 can determine whether the identified purification efficiency exceeds the reference efficiency by loading information about a pre-stored reference efficiency from the memory 130 and comparing the identified purification efficiency with the loaded reference efficiency. Here, the reference efficiency is a value pre-set by the manufacturer on the basis of exhaust gas regulations relating to the emission of pollutants in exhaust gases, and can be set (or updated) to a different value on the basis of test results. When the identified purification efficiency exceeds the reference efficiency, the processor 120 performs operation 505, and, when the identified purification efficiency does not exceed the reference efficiency, the processor can perform operation 403 of FIG. 4, in which the vehicle catalytic converter is heated.

In operation 505, when the identified purification efficiency exceeds the reference efficiency, the processor 120 can control the heating device 150 such that heating of the vehicle catalytic converter is ended.

Hereinabove, the electronic device 100 has been described as determining whether to end the heating operation of the vehicle catalytic converter on the basis of the purification efficiency of the vehicle catalytic converter calculated on the basis of the first air-fuel ratio of the exhaust gas entering the catalytic converter and the second air-fuel ratio of the exhaust gas exiting the catalytic converter, but, according to various implementations of the present disclosure, the electronic device 100 can also determine whether to end the operation of heating the vehicle catalytic converter on the basis of the second air-fuel ratio of the exhaust gas exiting the catalytic converter. For example, it is also possible for the electronic device 100 to measure the second air-fuel ratio of the exhaust gas exiting the catalytic converter, and, when the peak to peak value of the measured second air-fuel ratio is smaller than a reference peak to peak value, the operation of heating the catalytic converter is ended.

As has been described above, the electronic device 100 can ensure the purification efficiency of three way catalytic converters, regardless of vehicle state, by measuring the purification efficiency of the vehicle catalytic converter and determining whether to end the heating of the vehicle catalytic converter on the basis of the measured purification efficiency.

The term "module" used in the present document may include units implemented as hardware, software or firmware, and may, for example, be used interchangeably with terms such as logic, logical block, component or circuit. A module can be an integrally formed component or the smallest unit of the component or a portion thereof which performs one or more functions. For example, the module can be implemented as an application-specific integrated circuit (ASIC).

The various implementations in the present document can be implemented as software including one or more instructions stored on a storage medium (e.g. the memory 130 in FIG. 1) which is readable by a machine (e.g. the electronic device 100 in FIG. 1). For example, the processor (e.g. the processor 120 in FIG. 1) of the machine (e.g. the electronic device 100 in FIG. 1) can call at least one instruction of the one or more instructions stored in the storage medium and can execute same. This makes it possible to perform at least one function, which is managed in accordance with the at least one instruction called by the machine. The one or more instructions can include code generated by means of a compiler or code executable by means of an interpreter. The machine-readable storage medium can be provided as a non-transitory storage medium. Here, 'non-transitory' simply means a device of which the storage medium is tangible and that signals (e.g. electromagnetic waves) are not included, and this term does not differentiate between when data is semi-permanently stored or when temporarily stored on a storage medium.

According to various implementations, each constituent element (e.g. module or program) of the constituent elements described above may include a single entity or a plurality of entities. According to various implementations, one or more of the constituent elements or operations of any of the constituent elements described above can be omitted, or one or more other constituent elements or operations can be added. Alternatively or additionally, a plurality of constituent elements (e.g. modules or programs) may be combined into a single constituent element. In this case, the combined constituent element can perform the one or more of the functions of each of the constituent elements of the plurality of constituent elements, in a manner which is the same or similar to the manner in which said functions were performed by the constituent elements of the plurality of constituent elements prior to said combination. According to various implementations, operations performed by means of modules, programs or other constituent elements can be executed sequentially, in parallel, repeatedly or heuristically, or one or more of the operations can be executed in a different order or omitted, or one or more other operations can be added.

A number of implementations have been described. Nevertheless, it will be understood that various modifications may be made without departing from the spirit and scope of the disclosure. Accordingly, other implementations are within the scope of the following claims.

What is claimed is:

1. An electronic device for purifying exhaust gas comprising:
   a sensor module comprising a first sensor module and a second sensor module;
   a heating device;
   a memory; and
   a processor operatively coupled to the sensor module, the heating device, and the memory, the processor configured to:
   control the heating device such that a catalytic converter of a vehicle is heated,
   measure a first air-fuel ratio of the exhaust gas passing through the catalytic converter using the first sensor module during heating of the catalytic converter, measure a second air-fuel ratio of the exhaust gas exiting the catalytic converter using the second sensor module during heating of the catalytic converter, identify a purification efficiency of the catalytic converter by comparing the first air-fuel ratio and the second air-fuel ratio, determine whether the purification efficiency exceeds a reference efficiency, and when the purification efficiency exceeds the reference efficiency, control the heating device such that heating of the catalytic converter is ended based on the air-fuel ratio of the exhaust gas.

2. The electronic device of claim 1, further comprising:
a communication circuit,
wherein the processor is further configured to:
receive an input for activating the catalytic converter via the communication circuit, and
control the heating device such that the catalytic converter is heated in response to the receipt of the input.

3. The electronic device of claim 1, wherein when the purification efficiency does not exceed the reference efficiency, the processor is configured to control the heating device such that heating of the catalytic converter is maintained.

4. A method for purifying exhaust gas, the method comprising:
controlling, at a processor, a heating device such that a catalytic converter of a vehicle is heated;
measuring, at the processor, a first air-fuel ratio of the exhaust gas passing through the catalytic converter using a first sensor module during heating of the catalytic converter; and
measuring, at the processor, a second air-fuel ratio of the exhaust gas exiting the catalytic converter using a second sensor module during heating of the catalytic converter;
identifying, at the processor, a purification efficiency of the catalytic converter by comparing the first air-fuel ratio and the second air-fuel ratio;
determining, at the processor, whether the purification efficiency exceeds a reference efficiency; and
when the purification efficiency exceeds the reference efficiency, controlling, at the processor, the heating device such that heating of the catalytic converter is ended based on the air-fuel ratio of the exhaust gas.

5. The method of claim 4, wherein controlling the heating device such that the catalytic converter is heated comprises:
receiving, at the processor, an input for activating the catalytic converter via a communication circuit, and
controlling, at the processor, the heating device such that the catalytic converter is heated in response to the receipt of the input.

6. The method of claim 4, further comprising:
when the purification efficiency does not exceed the reference efficiency, controlling, at the processor, the heating device such that heating of the catalytic converter is maintained.

* * * * *